US009186706B2

(12) United States Patent
Van Haaster et al.

(10) Patent No.: US 9,186,706 B2
(45) Date of Patent: Nov. 17, 2015

(54) SORTING DEVICE AND METHOD OF OPERATING THE SORTING DEVICE (75) Inventors: Patrick Theodorus Johannes Van Haaster, De Zilk (NL); Jozef Walter Maria Hopman, Huizen (NL)

(73) Assignee: Eurosort B.V., Weesp (NL)

( * ) Notice: Subject to any disclaimer, the term of this patent is extended or adjusted under 35 U.S.C. 154(b) by 113 days.

(21) Appl. No.: 13/102,418

(22) Filed: May 6, 2011

(65) Prior Publication Data

US 2011/0272241 A1  Nov. 10, 2011

(30) Foreign Application Priority Data

May 6, 2010  (EP) ..................................... 10162109

(51) Int. Cl.
*B65G 47/10*  (2006.01)
*B07C 5/36*  (2006.01)
*B65G 47/38*  (2006.01)
*B65G 47/96*  (2006.01)

(52) U.S. Cl.
CPC . *B07C 5/36* (2013.01); *B65G 47/38* (2013.01); *B65G 47/967* (2013.01)

(58) Field of Classification Search
None
See application file for complete search history.

(56) References Cited

U.S. PATENT DOCUMENTS

| | | | | |
|---|---|---|---|---|
| 3,802,548 A * | 4/1974 | Wentz et al. | ................... | 198/357 |
| 4,238,024 A * | 12/1980 | Hirakawa et al. | ........... | 198/418.9 |
| 4,310,276 A * | 1/1982 | Castagnoli | ................. | 198/367.1 |
| 5,086,929 A * | 2/1992 | Richter et al. | ................. | 209/698 |
| 5,244,100 A | 9/1993 | Regier | | |
| 5,372,235 A | 12/1994 | Gennari | | |
| 6,499,582 B1 * | 12/2002 | Gillott | ........................... | 198/360 |
| 6,499,604 B1 | 12/2002 | Kitson | | |
| 8,731,708 B2 * | 5/2014 | Shakes et al. | ................. | 700/216 |
| 2004/0153208 A1 | 8/2004 | Wilke | | |
| 2006/0109105 A1 * | 5/2006 | Varner et al. | ............. | 340/539.12 |
| 2007/0022719 A1 * | 2/2007 | Berdelle-Hilge | ............... | 53/437 |
| 2008/0257795 A1 | 10/2008 | Shuttleworth | | |
| 2014/0081450 A1 * | 3/2014 | Kuehnrich et al. | ........... | 700/232 |

FOREIGN PATENT DOCUMENTS

DE       4413967     11/1994
DE    102005032533      1/2007

(Continued)

OTHER PUBLICATIONS

European Search Report of the European Patent Office Patent Office in counterpart foreign application No. 10162109.2 filed May 6, 2010.

*Primary Examiner* — Gene Crawford
*Assistant Examiner* — Lester Rushin
(74) *Attorney, Agent, or Firm* — Steven M. Koehler; Westman, Champlin & Koehler, P.A.

(57) ABSTRACT

A sorting device comprises a support member for supporting and transporting an article. The support member is drivable in a conveying direction. The sorting device also comprises a loading station at which at least an article can be loaded to the support member, and an unloading station at which at least an article can be removed from the support member. The unloading station is provided with a plurality of receivers for receiving an article that is removed from the support member. The receivers are arranged transversely with respect to the conveying direction and disposed such that they are below the support member when the support member is at the unloading station. Furthermore, the sorting device comprises a controller for directing an article that is supported and transported by the support member to a selected one of the receivers.

20 Claims, 9 Drawing Sheets

(56) References Cited

FOREIGN PATENT DOCUMENTS

| EP | 0611713 | 8/1994 |
|---|---|---|
| EP | 1371424 | 12/2003 |
| EP | 1647338 | 4/2006 |
| FR | 2678529 | 1/1993 |
| FR | 2893518 | 5/2007 |

\* cited by examiner

SORTING DEVICE AND METHOD OF OPERATING THE SORTING DEVICE

BACKGROUND

The discussion below is merely provided for general background information and is not intended to be used as an aid in determining the scope of the claimed subject matter.

Aspects of the invention relate to a sorting device for sorting articles.

Several types of sorting devices are known in the art. Normally, a batch of articles is supplied to the sorting device and distributed to different destinations by the sorting device. Due to increasing sales via internet, commonly known as electronic commerce or e-commerce, there is an increasing need for sorting articles to batches having a relatively low number of articles destined to a relatively high number of destinations. In the past, articles had to be sorted for 50-500 destinations, for example, whereas nowadays there is a need for more than 1000 destinations in order to operate a sorting device economically.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A sorting device comprises a support member for supporting and transporting an article, which is drivable in a conveying direction, a loading station at which at least an article can be loaded to the support member, an unloading station at which at least an article can be removed from the support member, wherein the unloading station is provided with a plurality of receivers for receiving an article being removed from the support member, which receivers are arranged transversely with respect to the conveying direction and disposed such that they are below the support member when the support member is at the unloading station, and a controller for directing an article that is supported and transported by the support member to a selected one of the receivers.

In the sorting device the support member can transport an article from the loading station to the unloading station and deliver the article to one of the receivers below the support member. The receivers are arranged transversely with respect to the conveying direction, for example a row of receivers, and the article at the support member can be discharged to one of the receivers. This provides the opportunity to make the sorting device very compact in case a plurality of rows of receivers are located behind each other in the conveying direction, to which rows of receivers a plurality of support members can discharge articles under operating conditions. When looking from above the receivers may form a matrix of receivers in that case. Due to the features of the sorting device a high number of receivers or destinations can be applied within a minimal space. The articles that are collected by a receiver may be handled further, for example wrapped and prepared for dispatching to a customer.

In practice the controller is adapted such that under operating conditions the article is located at a predetermined location at the support member corresponding to the location of the selected receiver with respect to the support member when the support member is at the unloading station. This means that the article arrives at the correct location and only has to be discharged for arriving at the pre-selected receiver. The controller may comprise or be supported by an operator who puts the article at a predefined location of the support member which location corresponds with one of the receivers disposed below the support member at the unloading station. In other words, the operator pre-positions the article at the support member. Alternatively, the controller may comprise a mechanical system such as a robot which displaces the article at the support member in transverse direction of the conveying direction before the support member arrives at the unloading station. In the latter case, an operator only has to put the article to the support member irrespective of the location at the support member.

In a specific embodiment the support member comprises a tray which is tiltable about a tilting axis extending transversely with respect to the conveying direction. This appears to be a simple solution since gravity helps to discharge the article from the tray at the unloading station. Depending on the location of the article on the tray in transverse direction with respect to the conveying direction it falls into one of the receivers.

The width of the tray may be such that it overlaps the receivers in a direction extending transversely with respect to the conveying direction when the support member is at the unloading station. In this case a single tray may support an article at different tray portions corresponding to the locations of the receivers below the tray at the unloading station. This means that a single tray can be used to sort articles to different receivers. It is also possible to apply a plurality of tiltable trays per support member, for example a dual tilt tray in case of a row of two receivers which extend transversely with respect to the conveying direction.

In an alternative embodiment the sorting device comprises a plurality of support members which are located behind each other and which are drivable in the conveying direction, wherein successive support members are spaced from each other for allowing an article to be discharged from the support member being at the unloading station in a direction opposite to the conveying direction, and a displacing member for displacing an article with respect to the support member in the direction opposite to the conveying direction at the unloading station. For example, in this case the article may be displaced with respect to the support member by a displacing member which is moved to a position in front of the article on an approaching tray such that the displacing member holds the article whereas the support member continues to move. The article will then fall from the tray between two successive trays.

In case of a tiltable tray it may be tiltable between a laying position and a downward position, wherein the sorting device further comprises a releasable locking member for holding an article to the tray in the downward position, wherein the device is adapted such that under operating conditions the tray is tilted downwardly before arriving at the unloading station and the locking member is released close to or at the unloading station. The advantage of this embodiment is that the support member is prepared for quickly discharging the article since the tray has already an inclined orientation before arriving at the receiver to which the article should be delivered. Upon de-locking the locking member the article immediately falls down.

The support member may be driven by a conveying member to which the support member is pivotally mounted, which conveying member is drivable along a conveying path, wherein the support member is tiltable with respect to the conveying member about the tilting axis. For example, the conveying member comprises a chain and the support members are pivotally coupled to the chain.

At least two of the receivers may be provided with receiver outlets for removing an article from the receiver, which receiver outlets are located at different height levels. This is advantageous for easily emptying the receivers, particularly when the receivers are disposed closely to each other. The receiver outlets comprise containers, for example, which can be emptied are replaced by empty containers during and after the sorting process.

In a specific embodiment the receivers comprise receiver guides for guiding articles downwardly, which receiver guides extend upwardly, preferably substantially vertically. This is a very simple but compact and effective structure. In practice rows of receivers may comprise rows of vertical cylindrical chutes or ducts. The receiver outlets may be formed by releasable bottoms of the chutes located at different height levels.

The sorting device may be provided with a conveyor for transporting articles in a conveyor conveying direction to the loading station, which conveyor comprises a plurality of supporting locations for supporting articles, the supporting locations being located transversely to the conveyor conveying direction and corresponding to the receivers, wherein the controller comprises a visual indicator device being provided to the conveyor for indicating at least a selected supporting location where an article should be placed. Due to the visual indicator device an operator can put an article at a predetermined supporting location, whereas the conveyor transports the article to the loading station. Since the selected supporting location at the conveyor corresponds to a selected receiver the article is placed at a desired location of the support member such that the article is discharged at the pre-selected receiver.

Alternatively, the support member may comprise a plurality of supporting locations for supporting articles located transversely to the conveying direction and corresponding to said receivers, wherein the controller comprises visual means for indicating at least a selected supporting location at the support member where an article should be placed at the loading station. In this embodiment the articles are directly placed at the correct supporting location of the support member without the presence of an additional conveyor upstream of the loading station.

The visual indicator device may be adapted such that the indicated supporting location can be seen by an operator when looking to said supporting location. This helps an operator to quickly observe the correct supporting location.

In a practical embodiment the visual indicator device comprises a light for illuminating the selected supporting location.

An aspect of the invention is also related to a method of operating a sorting device as described above, wherein articles are picked from a storage unit and collected in a batch which comprises at least a first sub-batch for collecting picked articles destined for a first series of destinations and a second sub-batch for collecting picked articles destined for a second series of destinations, wherein the picked articles are distributed to the first and second sub-batches depending on the destination of the picked articles, wherein the first and second sub-batches are transferred to the loading station of the sorting device and sequentially emptied at the loading station. This provides the opportunity to limit the number of destinations or receivers since the number of receivers is related to the capacity of the sub-batches. At the same time the orderpicking is efficient because an operator can distribute picked articles to both the first and second sub-batches. Of course, the number of sub-batches may be higher than two.

Aspects of the invention will hereafter be elucidated with reference to the very schematic drawings showing embodiments of the invention by way of example.

DETAILED DESCRIPTION OF THE ILLUSTRATIVE EMBODIMENTS

Figure 1:
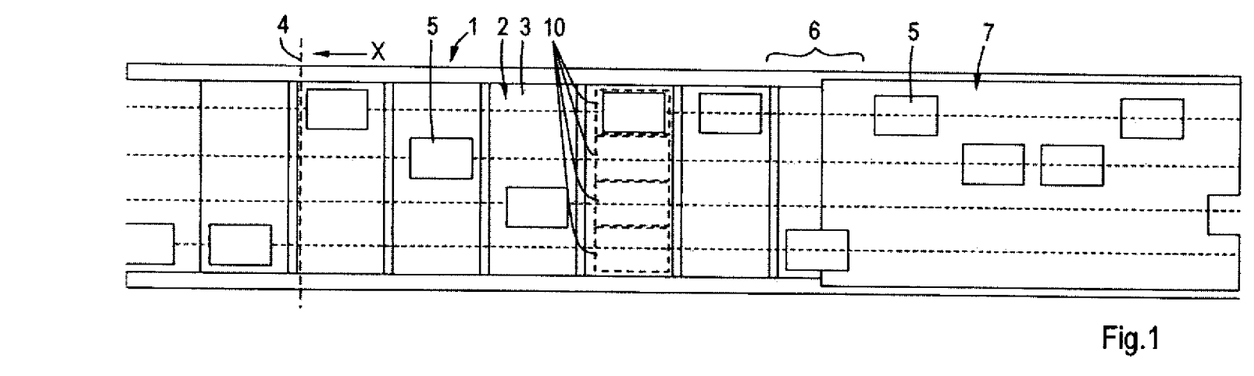
FIG. 1 is a plan view of a part of an embodiment of the sorting device.

FIG. 1 shows a part of an embodiment of a sorting device 1 as seen from above. The sorting device 1 comprises a plurality of support members 2 or containers that are drivable in a conveying direction X. In this embodiment each support member 2 comprises a tray 3 which is tiltable about a tilting axis 4 between a laying position and a downward position. The tilting axis 4 extends transversely with respect to the conveying direction X and has a horizontal component. In the embodiment as shown each tray 3 supports one article 5. The support members 2 may be coupled to each other via an endless belt or chain (not shown), for example, which is driven in the conveying direction X.

Figure 2:
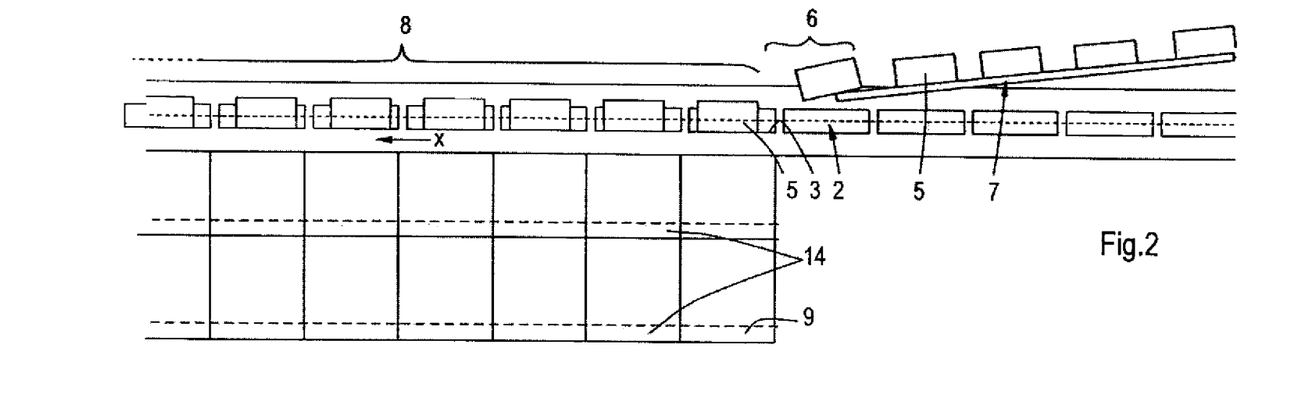
FIG. 2 is a side view of the embodiment according to FIG. 1.

The sorting device 1 is provided with a loading station 6 at which the articles 5 can be loaded to the support members 2. In this case the articles 5 are supplied to the loading station 6 via a conveyor 7, which may comprise an endless belt which supports and transports the articles 5. The conveyor 7 has an inclined orientation as shown in FIG. 2, and at the loading station 6 an end portion of the conveyor 7 is located above the tray 3 of the support member 2. As a consequence, the articles 5 fall downwardly onto the passing trays 3 under operating conditions. Alternative embodiments of supplying the articles 5 to the support members 2 are conceivable, for example by putting the article 5 manually on the trays 3 at the loading station 6.

Figure 3:
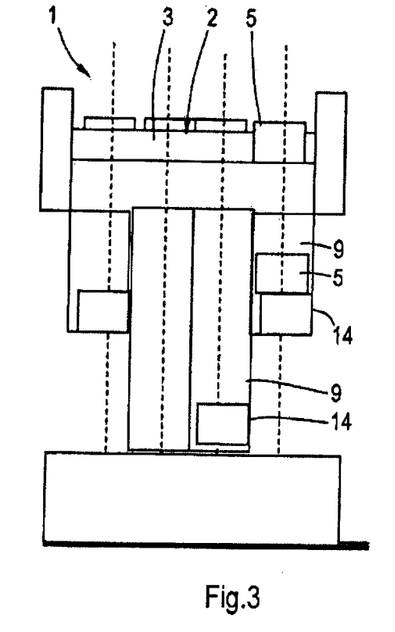
FIG. 3 is a front view of the embodiment according to FIG. 1.

The sorting device 1 is also provided with an unloading station 8 at which the articles 5 can be removed from the trays 3. The unloading station 8 is provided with a plurality of receivers 9 for receiving the articles 5, that are removed from the trays 3. The receivers 9 are arranged transversely with respect to the conveying direction X and are disposed below the support members 2; this is shown in FIG. 3. When a tray 3 that supports an article 5 is tilted at a pre-selected receiver 9 the article 5 falls downwardly and is received by that receiver 9. In FIG. 3 this is illustrated by a tilted tray 3 such that an article 5 falls to the rightmost receiver 9.

In the embodiment of FIGS. 1-3 the trays 2 have such a width that each tray 2 provides a row of four different supporting locations 10. The supporting locations 10 are virtual tray surface portions on which articles 5 can be placed. The widths of the trays 3 are such that an article 5 placed at one of the four possible supporting locations 10 will fall into one of the receivers 9. Therefore, the tray 3 overlaps the receivers 9 in a direction extending transversely with respect to the conveying direction X. Under operating conditions, in principle one article 5 is placed on one of the four supporting locations 10. Each supporting location 10 corresponds with one destination or one of the receivers 9. In other words, one row of supporting locations 10 of one support member 2 corresponds to one row of receivers 9 that is arranged transversely with respect to the conveying direction X. In the embodiment of FIGS. 1-3 each support member 2 comprises a single tray 3 comprising four supporting locations 10, but more or less supporting locations 10 are conceivable. Furthermore, the single tray 3 per support member 2 may be replaced by separate tiltable trays, for example dual trays in case of rows of two receivers 9, wherein each tray provides a single supporting location 10. In principle, one article 5 is put on one supporting location 10 at the loading station 6, but it is conceivable that two or more articles 5 destined to one pre-selected receiver 9 are put at the same supporting location 10. It is also possible that articles 5 are placed at more than one supporting location 10 of one support member 2.

Figure 8:
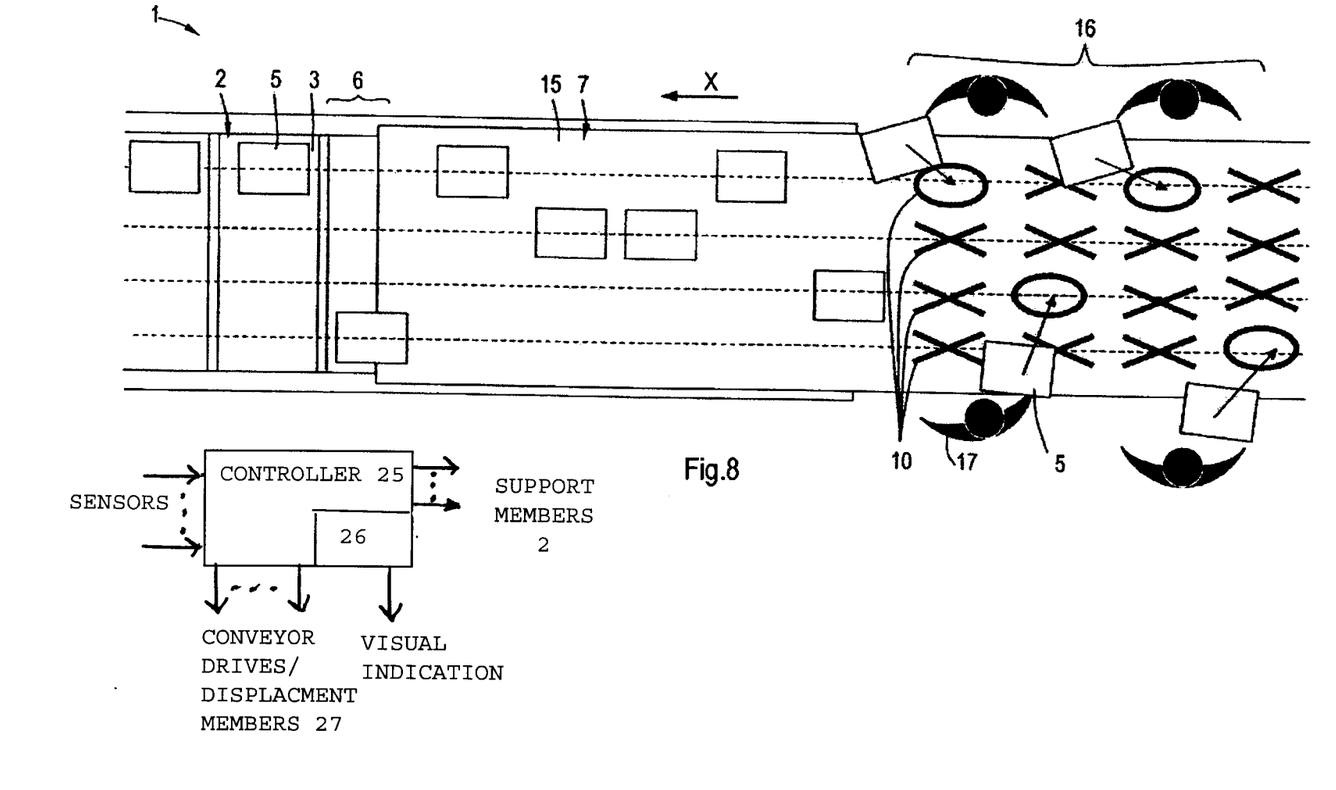
FIG. 8 is a plan view of a part of another alternative embodiment of the sorting device.

In order to direct the articles 5 to a selected one of the receivers 9 the sorting device is provided with a controller 25 (schematically shown in FIG. 8). In this case the controller 25 comprises a system which places the articles 5 on correct positions on the conveyor 7, such that they arrive on the desired supporting location 10 of each support member 2 that passes at the loading station 6. Several types of controllers are conceivable which will be explained hereinafter. Generally, the controller 25 is an analog and/or digital processor that receives or otherwise maintains information regarding the articles to be sorted. The controller 25 provides control signals to control operation of the support members 2, drive units for supporting conveyor(s), displacing member(s) 27 and a visual indicating device 26 discussed further below. The controller 25 receives parameter information regarding operation of the sorting device such as but not limited to proximity sensors, speed sensors and the like.

In any case the controller 25 may be adapted such that under operating conditions the article 5 is located at a predetermined location or supporting location 10 at the support member 2 which supporting location 10 corresponds to the location of the selected receiver 9 with respect to the corresponding support member 2 when this is at the unloading station 8.

Figure 4:
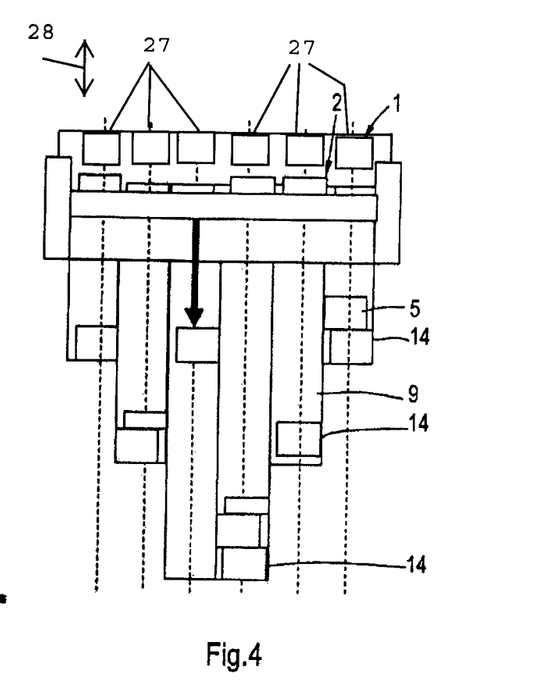
FIG. 4 is a similar view as FIG. 3 of an alternative embodiment.

In the embodiment as shown in FIGS. 1 and 2 adjacent support members 2 are located close to each other in the conveying direction X and articles are discharged by tilting the trays 3. Alternatively, successive support members 2 may be spaced from each other such that an article can be discharged from the support member 2 by moving the article 5 with respect to the support member 2 in a direction, for example, opposite to the conveying direction X such that the article 5 falls down between two successive support members 2. The movement can be effected by a displacing member(s) 27, wherein, for example as schematically illustrated in FIG. 4, each row of support members 2 includes a displacing member 27 (arm, plate, etc.) that is movable (for example, laterally across the tray 3 and/or up and down (represented by double arrow 28)) by suitable electric, hydraulic or pneumatic actuators (not shown) to selectively engage an article placed in the tray 3 so as to pull it out of the tray 3. The displacing member 27 can be provided on the support member 2, and thereby move with the support member 2 to discharge the article when desired, or the displacing member(s) 27 can be located in a stationary position relative to the moving support members 2 and engage the articles in the support members 2 when desired.

Figure 7:
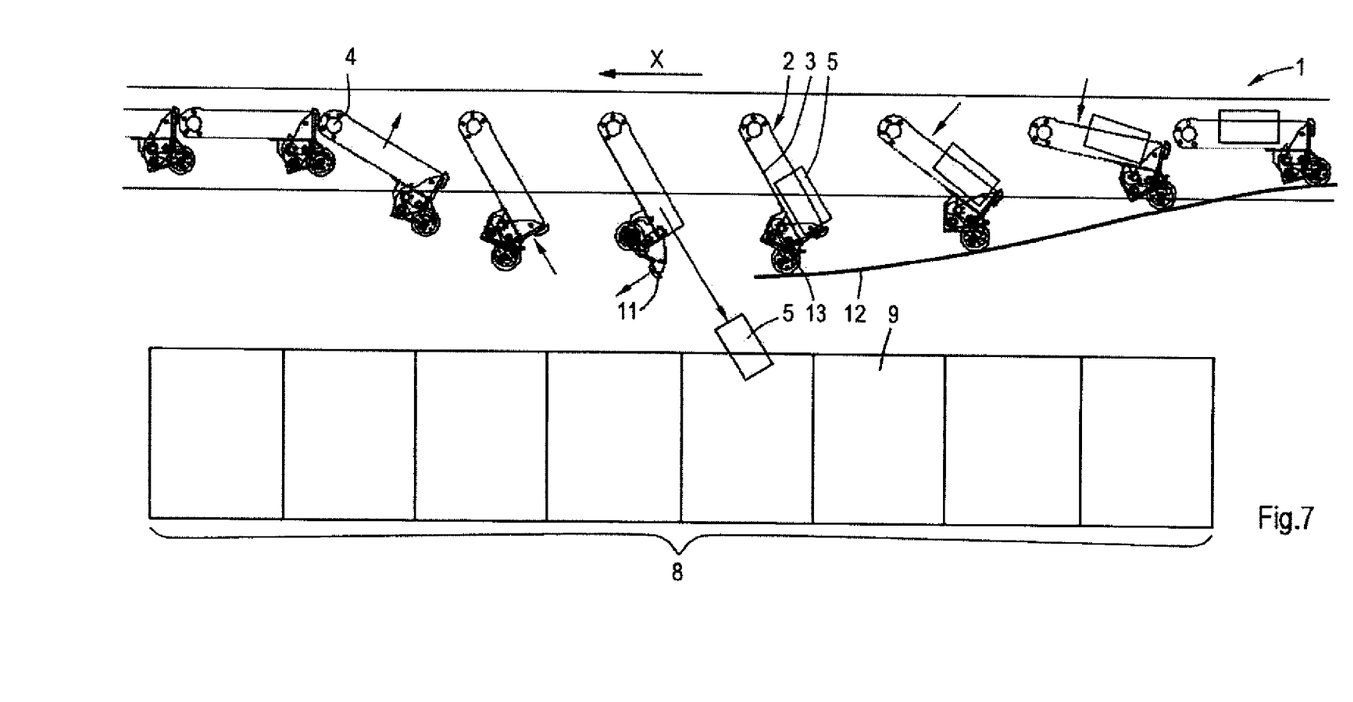
FIG. 7 is a side view of a part of an alternative embodiment of the sorting device.

FIG. 7 shows a specific embodiment of the sorting device 1 in detail. In this case the sorting device 1 comprises a releasable locking member 11 which is a tiltable door in this case. Under operating conditions the tray 3 is tilted downwardly before arriving at the pre-selected receiver 9. As shown in FIG. 7 the article 5 moves downwardly on the tray 3 upon tilting the tray 3 about the tilting axis 4. When the locking member 11 is closed the article 5 will stay on the tray 3. When arriving at the pre-selected receiver 9 the locking member 11 is discharged as illustrated in the middle of FIG. 7. Subsequently, the locking member 11 is closed and the tray 2 is tilted back upwardly from the downward position to the laying position. It is noted that the support member 2 may be more or less above a receiver 9 which is adjacent to the pre-selected receiver 9 when the locking member 11 is de-locked, but this is related to the orientation of the tray 3 and speed of the support member 2 with respect to the receiver 9. Due to the orientation as shown in FIG. 7 the article 5 has a speed component to the right with respect to the support member 2 and a speed component to the left due to the speed of the support member 2.

The upper surface of the tray 3 forms a bearing surface for supporting an article 5 and the bearing surface lies behind the tilting axis 4 such that it follows the tilting axis 4 under operating conditions. The embodiment as shown in FIG. 7 is provided with a guide 12 for guiding wheels 13 of the support member 2 during tilting of the tray 3 between the laying position and the downward position. A similar guide structure (not shown) can be used to return the support member 2 to the laying position. If desired, a suitable actuator (linear or rotational) can be used to selectively rotate each support member 2 between the laying and downward positions. The actuators can be electric, hydraulic or pneumatic operated.

It is noted that the embodiment as shown in FIG. 7 is not necessarily associated to other features of the sorting device as described hereinbefore. In other words, the invention is also related to the following aspects:

Aspect 1: A sorting device, comprising
 a support member for supporting and transporting an article, which is drivable in a conveying direction and tiltable between a laying position and a downward position about a tilting axis extending transversely with respect to the conveying direction,
 a loading station at which at least an article can be loaded to the support member,
 an unloading station at which at least an article can be removed from the support member,
 a releasable locking member for holding a product to the support member in the downward position thereof,
 wherein the device is adapted such that under operating conditions the support member is tilted downwardly before arriving at the unloading station and the locking member is released close to or at the unloading station.

The advantage of this sorting device is that the article is put ready for launching or discharging it by de-locking the locking member.

Aspect 2: A sorting device according to aspect 1, wherein the support member is drivable by a conveying member to which the support member is pivotably mounted, which conveying member is drivable along a conveying path, wherein the support member is tiltable with respect to the conveying member about the tilting axis. For example, the conveying member is a chain.

Aspect 3: A sorting device according to aspect 2, wherein the support member has a bearing surface for supporting an article, which bearing surface lies behind the tilting axis such that it follows the tilting axis under operating conditions. This provides the opportunity to tilt the support member in such a way that the bearing surface has a horizontal component which gives the article a speed with respect to the support member opposite to the speed of the support member in the conveying direction upon discharging the article. This reduces the horizontal speed of the article with respect to the unloading station when falling down.

Aspect 4: A sorting device according to one of the aspects 1-3, wherein the locking member comprises an obstacle which is located such that its position is at a lower portion of the support member in the downward position. Due to the obstacle an article at the support member is hold.

Aspect 5: A sorting device according to one of the aspects 1-4, wherein the sorting device is provided with a guide for guiding the support member between the laying position and the downward position.

Aspect 6: A sorting device according to aspect 5, wherein the support member comprises a wheel which is supported and guidable by the guide.

FIGS. 2 and 3 show that the receivers 9 are provided with receiver outlets 14. At the receiver outlets 14 one or more collected articles can be taken from the receivers 9. In this case the receiver outlets 14 comprise openings which are accessible transversely with respect to the conveying direction. The receiver outlets 14 are located at different height levels which makes it easy to empty the receivers 9. Particularly, when the rows of receivers 9 as shown in FIG. 3 are positioned close to each other as seen in the conveying direction X it is very advantageous that the receiver outlets 14 are positioned laterally at different height levels.

In the embodiment as shown in FIG. 3 the receivers 9 are formed by upwardly directed or substantially vertical receiver guides for guiding the articles 5 downwardly. The receiver guides may be chutes or cylindrical ducts or the like. The receiver outlets 14 may also be formed by releasable bottoms of the receivers 9 which are disposed at different height levels, wherein the bottom of the outermost receiver 9 as seen in transverse direction preferably has the highest level.

Figure 5:
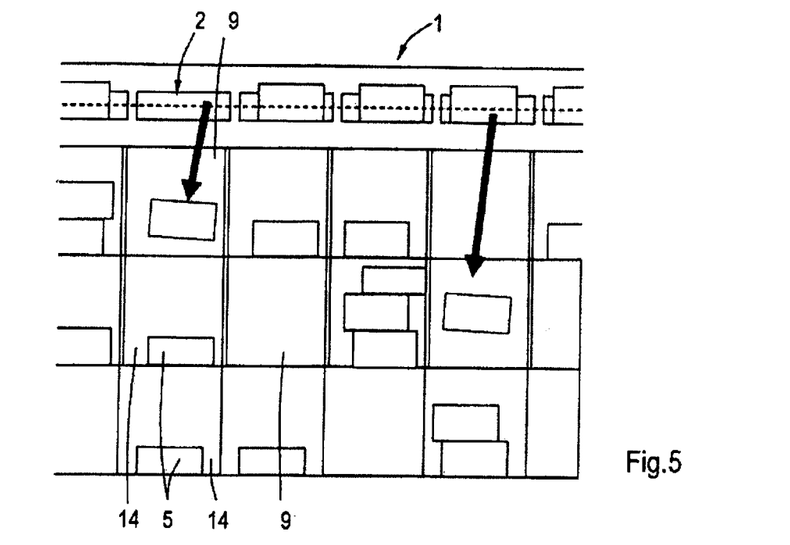
FIG. 5 is a similar view as a part of FIG. 2 of the alternative embodiment according to FIG. 4.

FIGS. 4 and 5 show receiver guides of an alternative embodiment of the sorting device 1. In this case a row of six receivers 9 are arranged transversely with respect to the conveying direction X. The bottoms of both receivers 9 in the middle have the lowest height level and of the outermost receivers 9 have the highest level. The articles 5 collected in the different receivers 9 can be taken out easily at the receiver outlets 14 disposed at different height levels.

Figure 6:
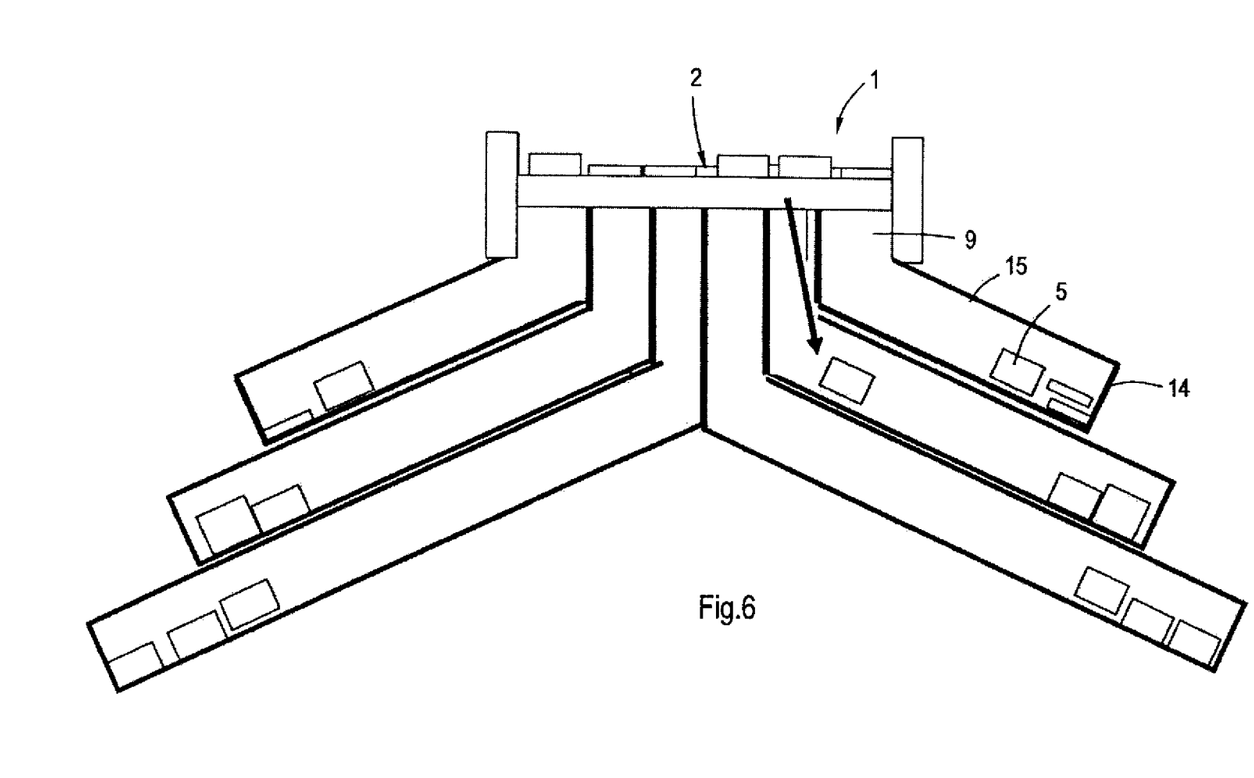
FIG. 6 is a similar view as FIGS. 3 and 4 of an alternative embodiment.

FIG. 6 shows still another alternative embodiment of the receiver guides. Also in this case a row of six receivers 9 are arranged transversely with respect to the conveying direction X. The receivers 9 are provided with sliding chutes 15 which have inclinations with respect to a horizontal plane. The receiver outlets 14 are still located above each other.

In more general terms the invention is also related to the following aspects:

Aspect 1: A sorting device, comprising
a support member for supporting and transporting an article, which is drivable in a conveying direction,
a loading station at which at least an article can be loaded to the support member,
an unloading station at which at least an article can be removed from the support member, wherein the unloading station is provided with at least two receivers for receiving an article being removed from the support member, which receivers are arranged transversely with respect to the conveying direction and disposed such that they are below the support member when the support member is at the unloading station,
wherein the receivers are provided with receiver outlets for removing an article from the receiver, which receiver outlets are located at different height levels. This means that the receivers can be located close to each other whereas the articles being collected by the receivers can be taken out easily.

Aspect 2: A sorting device according to aspect 1, wherein the receivers comprise receiver guides for guiding articles downwardly and extend upwardly, preferably substantially vertically.

Aspect 3: A sorting device according to aspect 1 or 2, wherein the receivers are provided with sliding chutes extending obliquely in downward direction with respect to the support member. Due to this feature the inclined chutes can be designed such that the receiver outlets are disposed close to each other as seen in horizontal direction transversely with respect to the conveying direction.

Figure 9:
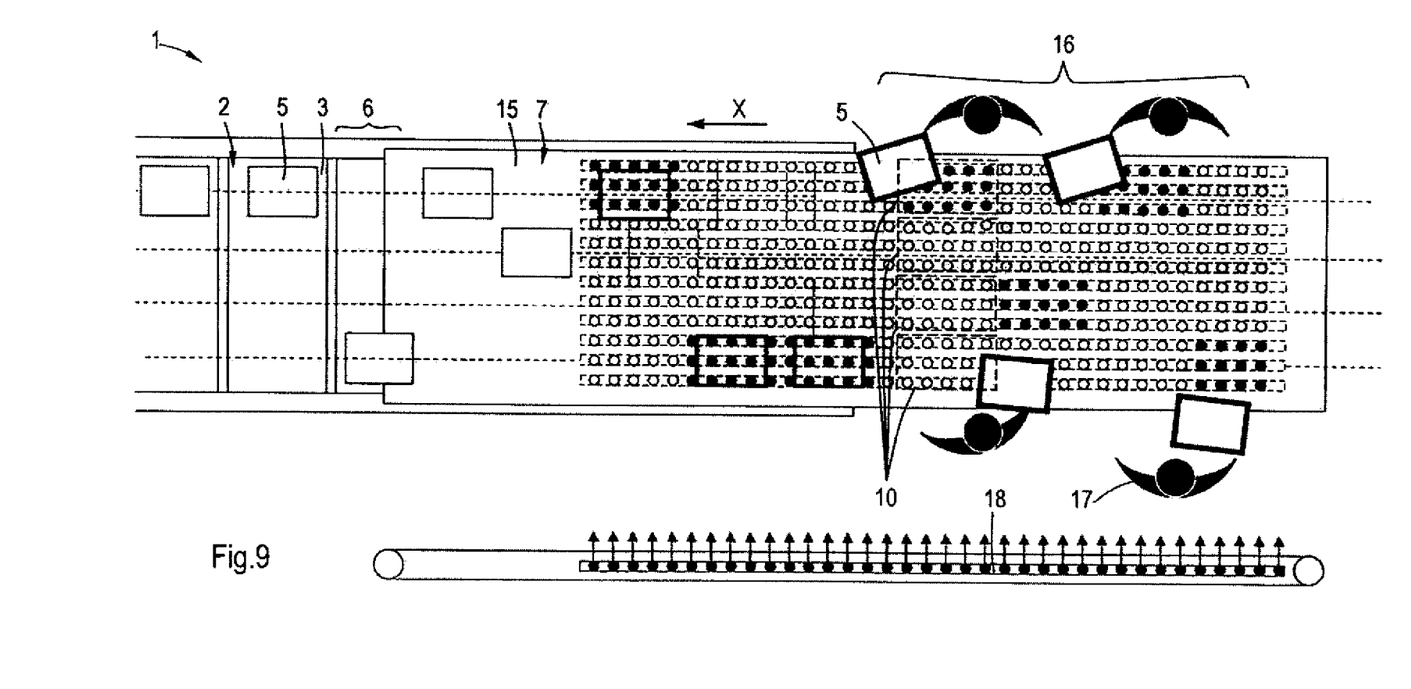
FIG. 9 is a similar view as FIG. 8 of an alternative embodiment and a side view thereof.

As described in the embodiment as shown in FIG. 1 hereinbefore the articles 5 have to be placed on correct positions on the conveyor 7, such that they arrive on the desired supporting locations 10 of the passing support members 2 at the loading station 6. FIGS. 8 and 9 show possible embodiments of the conveyor 7 for transporting articles 5 in the conveyor conveying direction which is similar to the conveying direction X of the support members 2 in this case. The conveyor 7 comprises a conveyor belt 15 and a conveyor loading station 16 where the articles 5 can be placed on an upper surface of the conveyor belt 15 by operators 17. The conveyor belt 15 is relatively wide in order to place articles on the belt 15 at four different supporting locations 10 which are positioned transversely to the conveying direction X and correspond with the supporting locations 10 of the support members 2 as explained hereinbefore. In this case the articles 5 are transported to the loading station 6 where the articles 5 are transferred to the tilt trays 3. The location of an article 5 on the tray 3 in transverse direction with respect to the conveying direction X is related to a predetermined destination or receiver 9. Therefore, it is important that the operators 17 place the articles 5 on the correct supporting location 10 of the conveyor belt 15.

FIG. 8 illustrates by crosses and ovals a number of supporting locations 10 where articles 5 can be placed. The ovals indicate the selected supporting locations 10 where the operators 17 should place an article 5 on the conveyor belt 15, whereas the crosses indicate supporting locations 10 that should be left free. A higher or lower number of supporting locations 10 in transverse direction are conceivable. The conveyor 7 may also be provided with a safety system which generates an alert when an operator 17 has placed an article 5 on a wrong supporting location 10. The support members 2 and the conveyor belt 15 are driven such that an article 5 which is placed on a pre-selected supporting location 10 of the conveyor belt 15 arrives at the loading station 6 at the moment that a corresponding support member 2 passes the loading station 6. The article 5 falls on the corresponding supporting location of the support member 2 and is transported to the pre-selected receiver 9.

The crosses and ovals are part of a visual indicating device 26 for indicating the selected supporting locations 10 where articles 5 should be placed. In the embodiment according to FIG. 8 the visual indicating device 26 comprises lights (not shown) which project signs in the form of crosses and ovals on the conveyor belt 15 from above. Of course, alternative types and shapes of signs are conceivable, for example different colours or patterns. In this case the lights illuminate all supporting locations 10 in transverse direction of the conveyor belt 15, both the selected supporting location 10 on which an article 5 should be placed and the supporting locations 10 that should be left free. It is, however, also possible that only the selected supporting location 10 on which an article 5 should be placed is illuminated.

For ergonomical reasons it may be desired that the signs are visible during a certain period of time under operating conditions. Therefore, the visual indicating device 26 is configured (movable light fixtures, reflecting mirrors, etc.) such that the projected signs are temporarily movable simultaneously with the conveyor belt 15. In the embodiment of FIG. 8 four operators 17 are present to place articles 5 on the conveyor belt 15. Therefore, four rows of signs are projected on the conveyor belt 15 as seen in the conveying direction X. The number of rows may be different. Each row corresponds with one support member 2. If the operator 17 misses a row he or she can immediately place an article 5 on a next row.

In the embodiment according to FIG. 9 the conveyor belt 15 is translucent. The conveyor 7 is further provided with a matrix of LEDs 18 forming part of the visual indicating device 16 illuminate the conveyor belt 15 from below. The LEDs 18 are controlled such that the selected supporting location 10 can be distinguished by an operator 17 when looking to the upper side of the conveyor belt 15. In this case the selected supporting location 10 on which an article 5 should be placed can be distinguished from the supporting locations 10 that should be left free by only illuminating the selected supporting location on which an article 5 should be placed or by controlling the matrix of LEDs 18 in such a way that different signs are created. Also in this embodiment the signs may temporarily move simultaneously with the conveyor belt 7, for example, by selectively energizing LEDs 18 below the conveyor belt 7, which is comparable to the way in which an illuminated news trailer works.

The supporting locations 10 are in fact virtual locations. If the visual indicating device is not present the conveyor belt 15 may have an obstacle-free flat upper surface without any indication of discrete supporting locations 10.

Under operating conditions the support members 2 may be circulated through the sorting device 1 whereas an article 5 is not discharged at a receiver 9, for example because the receiver 9 is not empty yet. As a consequence, the loaded support member 2 will pass the loading station 6. In such a case the visual indicating device may be controlled such that no supporting location 10 on the conveyor belt 15 is indicated in a corresponding row extending transversely to the conveying direction X in order to leave the row free from articles.

It is noted that the conveyor belt 15 may be formed by slats mounted to a driven chain, a chain belt, discrete trays, modular plastic belts, fabric belts, translucent belts, and the like. Alternative visual indicating devices can be mechanical indicators, for example indicators that are shifted in transverse direction with respect to the conveying direction in case of the embodiments as described above. Furthermore, it is possible that the conveyor loading station 16 is located at the loading station 6 of the trays 3 such that the articles 5 are directly placed on selected supporting locations 10 on the trays 3. In this case, the trays may be translucent and be made of similar material as the belts mentioned above.

The embodiment as shown in FIGS. 8 and 9 is not necessarily associated to other features of the sorting device as described hereinbefore. In other words, the invention is also related to the following aspects:

Aspect 1: A conveyor for transporting articles in a conveyor conveying direction, comprising
 supporting locations for supporting articles,
 wherein the conveyor is provided with a visual indicating device for indicating at least a selected supporting location where an article should be placed. Due to this feature the moment of arriving of the article at a downstream location can be influenced.

Aspect 2: A conveyor according to aspect 1, wherein the visual indicating device is adapted such that the indication is temporarily movable simultaneously with the selected supporting location. This provides a certain period of time to place an article at the selected supporting location under operating conditions.

Aspect 3: A conveyor according to aspects 1 or 2, wherein the conveyor comprises a conveyor belt and the supporting locations are formed at an upper surface thereof.

Aspect 4: A conveyor according to one of the aspects 1-3, wherein the visual indicating device is adapted such that the selected indicated supporting location can be seen by an operator when looking to said supporting location. This helps an operator to easily and quickly find the selected supporting location.

Aspect 5: A conveyor according to one of the aspects 1-4, wherein the visual indicating device is adapted such that at least one of two supporting locations positioned transversely to the conveyor conveying direction can be indicated. In this case, not only the moment of arriving at a downstream location can be influenced but also the location in transverse direction.

Aspect 6: A conveyor according to aspect 5, wherein said two locations can be indicated simultaneously by means of different signs.

Aspect 7: A conveyor according to one of the aspects 1-6, wherein the visual indicating device comprises a light for illuminating the selected supporting location.

Aspect 8: A conveyor according to aspect 4 and 7, wherein the light projects a sign on the conveyor belt at the selected supporting location.

Aspect 9: A conveyor according to aspect 8, wherein the light is directed from above onto the conveyor belt.

Aspect 10: A conveyor according to aspect 8, wherein the conveyor belt is translucent whereas the light is projected from below to a lower surface thereof.

Aspect 11: A conveyor according to one of the aspects 7-10, wherein the conveyor is provided with a matrix of lights or LEDs for illuminating the conveyor belt, wherein the lights or LEDs are controlled such that the indication is temporarily movable simultaneously with the selected supporting surface.

The sorting device 1 may be operated by a specific method as explained hereinafter. The method is illustrated by means of FIG. 10 in which the conveyor 7 including the conveyor loading station 16 is shown. As described hereinbefore the articles 5 are transported to the loading station 6 and from there to the unloading station 8 which comprises a plurality of receivers 9 for receiving the sorted articles 5, see FIGS. 1-7. In the method the articles 5 are picked from a storage unit 19 and collected in a collecting container or a batch 20. The batch 20 may be a vehicle which is displaceable by an operator 17' who picks the articles 5 from the storage unit 19 and adds them to the batch 20, but alternative means are conceivable, such as a conveyor belt or the like.

Figure 10:
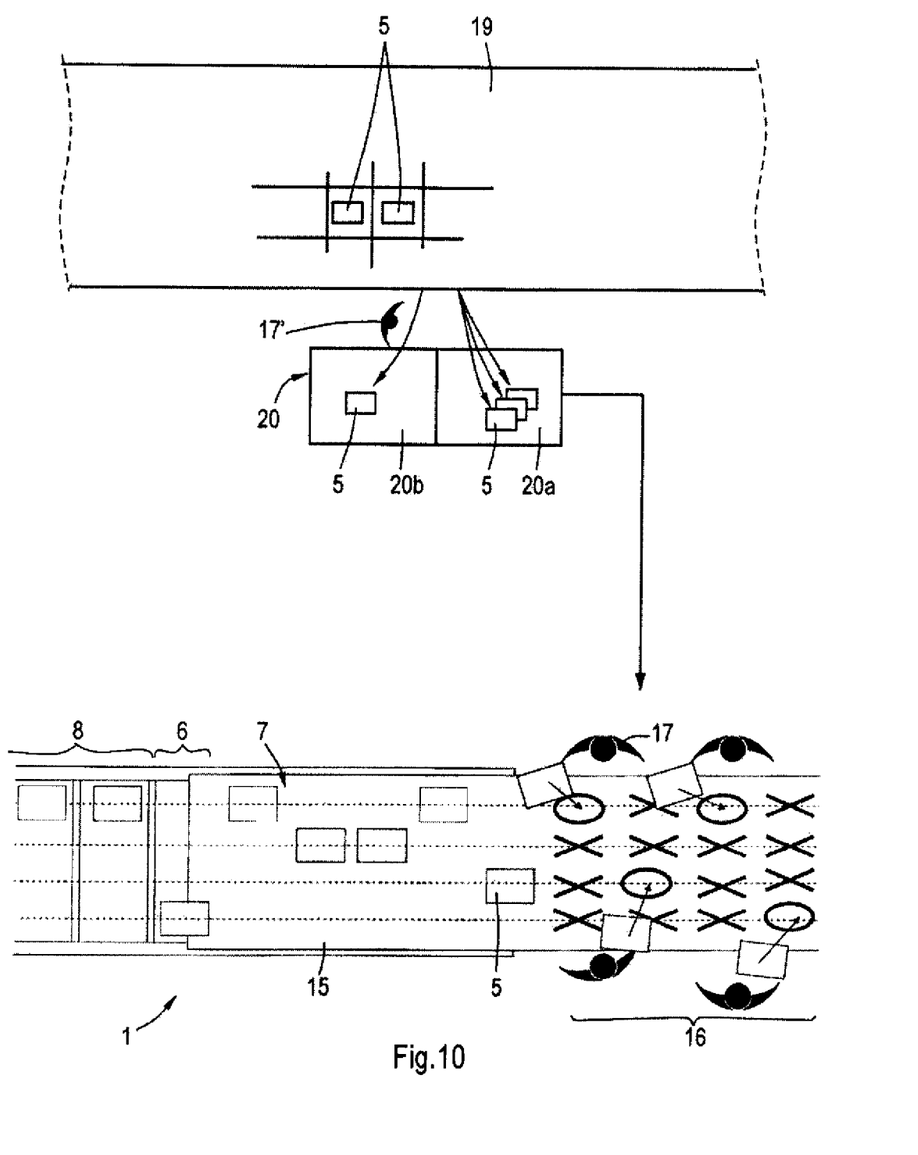
FIG. 10 is an illustrative view of an alternative embodiment of the sorting device.
Figure 11:
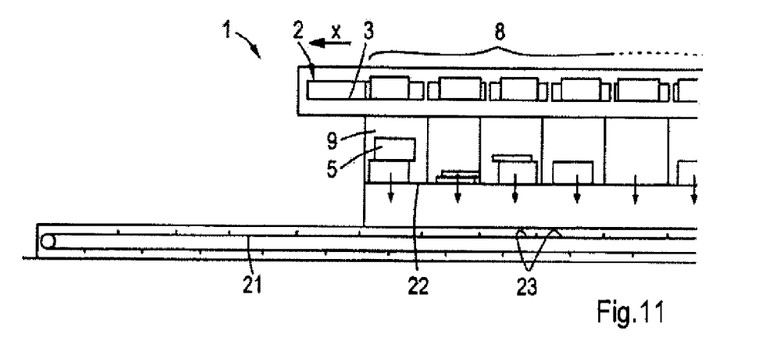
FIG. 11 is a similar view as FIG. 2 of an alternative embodiment at a smaller scale.
Figure 12:
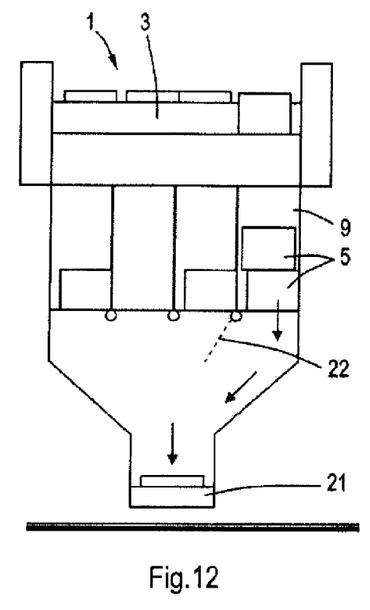
FIG. 12 is a front view of the embodiment according to FIG. 11 at a larger scale.
Figure 13:
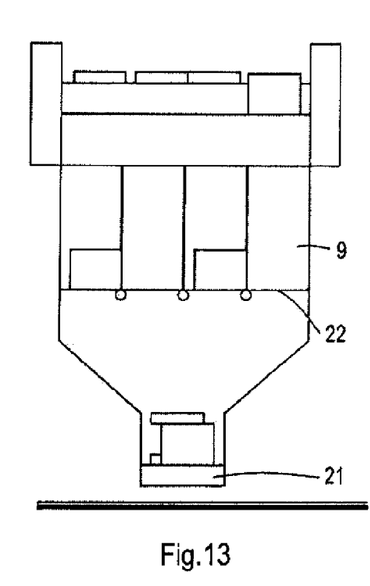
FIGS. 13-15 are similar views as FIG. 12, illustrating the unloading process of the receivers.
Figure 14:
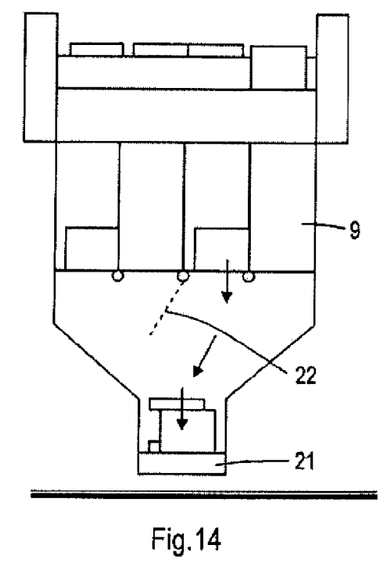
Figure 15:
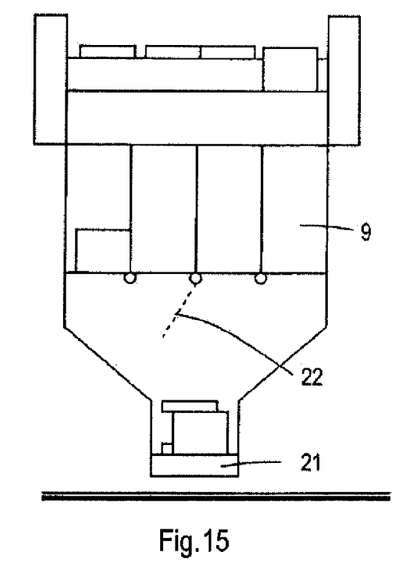

In this embodiment the batch 20 comprises a first sub-batch 20a for collecting picked articles 5 destined for a first series of receivers 9 and a second sub-batch 20b for collecting picked articles 5 destined for a second series of receivers 9. The operator 17' distributes the picked articles 5 to the first and second sub-batches 20a, 20b depending on the destination of the picked articles 5. In order to facilitate this process of orderpicking the operator 17' receives instructions in respect of the type of article 5 which should be picked, the number of those articles 5 to be picked and the number of picked articles 5 to be put to the first and to the second sub-batches 20a, 20b.

After picking the articles 5 from the storage unit 19 the operator 17' takes the first and second sub-batches 20a, 20b to the conveyor loading station 16 of the sorting device 1 where the sub-batches 20a, 20b are emptied sequentially for further sorting the articles 5 to separate receivers 9 or destinations in a way as described hereinbefore.

For example, in the first sub-batch 20a articles 5 are collected for 100 receivers 9, destinations, customers or the like, and in the second sub-batch 20b articles are collected for another 100 receivers 9. Both sub-batches 20a, 20b are filled at the same time by the operator 17', for example by picking twenty similar articles 5 from the storage unit 19, of which five are put to the first sub-batch and fifteen to the second sub-batch 20b. Normally, the sub-batches 20a, 20b will be filled with at least 100 articles 5 each, but a higher number is possible if more than one article 5 is destined for one receiver 9.

After both sub-batches 20a, 20b have been filled the whole batch 20 or the sub-batches 20a, 20b separately is/are transferred to the conveyor loading station 16 of the sorting device 1. At the conveyor loading station 16 the first series of articles 5 of the first batch 20a are supplied to the sorting device 1. The first series of articles for 100 receivers are sorted to 100 receivers 9, for example, which can be emptied after the articles 5 of the first batch 20a have been sorted. Subsequently, the second series of articles 5 of the second batch 20b are supplied to the sorting device 1 and so on.

This means that a total batch of 200 destinations does not require a sorting device including 200 receivers 9. Due to picking articles 5 and distributing these articles 5 over the first and second sub-batches 20a, 20b the orderpicking is performed for 200 destinations within one run. As a result, a high level of efficiency of orderpicking and sorting is achieved, whereas a relatively low number of receivers 9 can be applied.

It is noted that this kind of orderpicking is not necessarily associated to other features of the sorting device as described hereinbefore. In other words, the invention is also related to the following aspects:

Aspect 1: A method of supplying articles to a sorting device, wherein the sorting device comprises a loading station for receiving articles to be sorted and an unloading station comprising a plurality of receivers for receiving sorted articles, wherein articles are picked from a storage unit and collected in a batch which comprises at least a first sub-batch for collecting picked articles destined for a first series of destinations and a second sub-batch for collecting picked articles destined for a second series of destinations, wherein the picked articles are distributed to the first and second sub-batches depending on the destination of the picked articles, wherein the first and second sub-batches are transferred to the loading station of the sorting device and sequentially emptied at the unloading station. During the process of orderpicking the articles are pre-sorted to sub-batches. This means that articles for a high number of destinations can be picked at the same time, whereas a relatively low number of receivers are required.

Aspect 2: A method according to aspect 1, wherein the articles are picked by an operator who is instructed about the type and number of articles to be picked and the number of picked articles to be put to the first sub-batch and to the second sub-batch.

FIGS. 11-15 show a part of an embodiment of the sorting device 1, in which at the unloading station 8 the device 1 is provided with a discharge conveyor 21. The discharge conveyor 21 is drivable in the conveying direction X and extends below the bottoms 22. Each of the receivers 9 comprises a receiver outlet or a bottom 22 that can be opened, for example under the control of the controller 25, for discharging one or more collected articles 5 in the receiver 9 to the discharge conveyor 21. In this embodiment the bottoms 22 are formed by tiltable panels connected to suitable actuators, but alternative receiver outlets are conceivable. The bottom 22 of a receiver 9 is closed during a period of sorting articles 5.

In the embodiment as shown in FIGS. 11-15 the sorting device 1 comprises a guide or funnel-shaped element between the receivers 9 and the discharge conveyor 21. When all articles 5 destined for a pre-selected receiver 9 have arrived at that receiver 9, the corresponding bottom 22 can be opened and the collected articles will fall downwardly onto the discharge conveyor 21 via the guide. The discharge conveyor 21 comprises discrete collecting portions 23 which are separated by upright barriers, walls, partitions on a drivable conveyor belt, or the like. It is also possible to create the discrete collecting portions 23 by containers on a barrier-free drivable conveyor belt. FIGS. 12-15 illustrate sequential emptying of a number of receivers 9. The device 1 can be controlled such that during the sorting process the discharge conveyor 21 runs continuously and receivers 9 are emptied on free locations or free discrete collecting portions 23 of the discharge conveyor 21, such that sorting and discharging are performed simultaneously. The discrete collecting portions 23 are intended to keep articles 5 destined for different destinations separated from each other. Further downstream of the discharge conveyor 21 articles 5 for different destinations may be wrapped, for example. After emptying a receiver 9 this can be used again as a destination in the sorting process.

In an alternative embodiment (not shown) the width of the discharge conveyor 21 is such that more than one receiver 9 located transversely with respect to the conveying direction X can be emptied at the same time. In a specific embodiment the discharge conveyor 21 may have a number of discrete collecting portions 23 located transversely to the conveying direction X which equals the number of receivers 9 in that direction. This means that all receivers 9 in such a transverse row of receivers 9 can be emptied simultaneously. In this case the row of receivers 9 can be provided with a single common bottom 22 that can be opened. After emptying a row of receivers 9 and closing the common bottom 22 the whole row of receivers 9 is available for the sorting process again.

Articles 5 that are transported by the discharge conveyor 21 may be handled downstream thereof, for example wrapping the articles and making them ready for dispatching, or supplied again to the sorting device 1 for further sorting.

In more general terms the invention is also related to the following aspects:

Aspect 1: A sorting device, comprising
a support member for supporting and transporting an article, which is drivable in a conveying direction,
a loading station at which at least an article can be loaded to the support member,
an unloading station at which at least an article can be removed from the support member, wherein the unloading station is provided with at least two receivers for receiving an article being removed from the support member, wherein the receivers are provided with receiver outlets for removing an article from the receiver,
a discharge conveyor for receiving articles that are removed from the receivers, which discharge conveyor is drivable in the conveying direction and extends below the receiver outlets. This provides the opportunity to transport sorted articles individually away from the unloading station for further handling.

Aspect 2: A sorting device according to aspect 1, wherein the receivers are arranged transversely with respect to the conveying direction. Due to the presence of the discharge conveyor a row of receivers arranged in transverse direction with respect to the conveying direction can be large since it is not required to access the receivers manually for emptying them.

Aspect 3: A sorting device according to aspect 1 or 2, wherein the discharge conveyor comprises discrete collecting portions in the conveying direction and/or in a direction transversely to the conveying direction. This prevents mixing of articles coming from different receivers and which are destined for different destinations.

Aspect 4: A sorting device according to aspect 3, wherein the discrete collecting portions are separated by upright partitions. This is a relatively simple solution, for example a conveyor belt including upstanding edges located at mutual distance in the conveying direction and/or in transverse direction thereof. The dimensions of each collecting portion may be similar to the dimensions of each receiver outlet.

Aspect 5: A sorting device according to one of the preceding aspects and aspect 2, wherein the device is provided with a guide for guiding articles from at least two receiver outlets to a common location above the discharge conveyor. In this case two receiver outlets can discharge articles to a relatively narrow conveyor.

Aspect 6: A sorting device according to claim 5, wherein the receiver outlets can be opened separately. In this case the device can be controlled such that a collecting portion of the discharge conveyor receives one or more articles from a first receiver upon opening the corresponding receiver outlet, then the discharge conveyor is driven further such that a free collecting portion can receive one or more articles from a second receiver. The receiver outlets may be tiltable trays, for example.

Aspect 7: A sorting device according to one of the preceding aspects, wherein the discharge conveyor comprises a number of discrete collecting portions in a direction transversely to the conveying direction, which is equal to the number of receivers in that direction. This provides the opportunity to empty a row of receivers which are arranged transversely with respect to the conveying direction simultaneously such that after emptying the row of receivers they can be used again for filling with sorted articles.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A sorting device, comprising
a support member configured to support and transport an article, which is drivable in a conveying direction, the support member having a plurality of support locations extending adjacent each other in a row, said row extending transversely with respect to the conveying direction,
a loading station configured to load an article on the support member,
an unloading station configured to remove an article from the support member, wherein the unloading station is provided with a plurality of receivers in a row, each receiver configured to receive an article being removed from the support member, the row of the plurality of receivers arranged transversely with respect to the conveying direction and disposed such that at least one receiver is below the support member when the support member is at the unloading station, wherein each of the plurality of receivers in the row corresponds to one of the support locations in the row of the plurality of support locations of the support member, and
a controller configured to direct transfer of an article from the support member to a selected one of the receivers,
wherein the support member comprises a single tray which is tiltable about a tilting axis extending transversely with respect to the conveying direction.

2. The sorting device according to claim 1, wherein the controller is configured such that the article is located at a predetermined support location of the plurality of support locations corresponding to the location of the selected receiver when the support member is at the unloading station.

3. The sorting device according to claim 1, wherein the width of the tray is such that it overlaps the receivers in a direction extending transversely with respect to the conveying direction when the support member is at the unloading station.

4. The sorting device according to claim 1, wherein the sorting device comprises a plurality of support members located behind each other and drivable in the conveying direction, wherein successive support members are spaced from each other for allowing an article to be discharged from the support member being at the unloading station in a direction opposite to the conveying direction, the sorting device further comprising a displacing member configured to displace an article with respect to the support member so as to remove the article from the support member at the unloading station.

5. The sorting device according to claim 1, wherein the tray is tiltable between a laying position and a downward position, wherein the sorting device further comprises a releasable locking member configured to hold an article to the support member in the downward position, wherein the sorting device is configured such that under operating conditions the support member is tilted downwardly before arriving at the unloading station and the locking member is released close to or at the unloading station.

6. The sorting device according to claim 5, wherein the support member is drivable by a conveying member to which the support member is pivotably mounted, which conveying member is drivable along a conveying path, wherein the support member is tiltable with respect to the conveying member about the tilting axis.

7. The sorting device according to claim 1, wherein at least two of the receivers are provided with receiver outlets configured to allow removal of an article from the receiver, which receiver outlets are located at different height levels wherein the receivers are provided with receiver outlets for removing an article from the receiver and the device also comprises a discharge conveyor for receiving articles that are removed from the receiver outlets, which discharge conveyor is drivable in the conveying direction and extends below the receiver outlets.

8. The sorting device of claim 7 wherein the receivers are provided with receiver outlets for removing an article from the receiver and the sorting device also comprises a discharge conveyor configured to receive articles that are removed from the receiver outlets, which discharge conveyor is drivable in the conveying direction and extends below the receiver outlets.

9. The sorting device according to claim 7, wherein the receivers comprise receiver guides configured to guide articles downwardly, which receiver guides extend upwardly.

10. The sorting device according to claim 1, wherein the sorting device is provided with a conveyor configured to transport articles in a conveyor conveying direction to the loading station, which conveyor comprises a plurality of supporting locations for supporting articles, which supporting locations are located transversely to the conveyor conveying direction and correspond to said receivers, wherein the controller comprises a visual indicating device configured to indicate at least a selected supporting location where an article should be placed.

11. The sorting device according to claim 1, wherein the row of supporting locations are located transversely to the conveying direction and correspond to said row of receivers, wherein the controller comprises a visual indicating device configured to indicate at least a selected supporting location where an article should be placed at the loading station.

12. The sorting device according to claim 10, wherein the visual indicating device is configured such that the selected indicated supporting location can be seen by an operator when looking to said supporting location, and wherein the visual indicating device is configured such that the indication is temporarily movable simultaneously with the selected supporting location.

13. The sorting device according to claim 10, wherein the visual indicating device comprises a light for illuminating the selected supporting location.

14. The sorting device according to claim 10 wherein the supporting location is formed at a translucent portion of the conveyor whereas the light is projected from below to a lower surface of the translucent portion.

15. A method of supplying articles to a sorting device, wherein the sorting device comprises a loading station for receiving articles to be sorted and an unloading station comprising a plurality of receivers for receiving sorted articles, the method comprising collecting articles in batches comprising at least a first sub-batch for collecting picked articles destined for a first series of destinations and a second sub-batch for collecting picked articles destined for a second series of destinations, wherein the picked articles are distributed to the first and second sub-batches depending on the destination of the picked articles, wherein the first and second sub-batches are transferred to the loading station of the sorting device and sequentially emptied at the unloading station, wherein the first and second sub-batches are part of one collecting container.

16. A method of sorting a plurality of articles, the method comprising:
positioning an article on a support member configured to support and transport an article on a selected support location in a plurality of support locations extending adjacent each other in a row on the support member, the plurality of support locations extending transversely with respect to the conveying direction;
moving the support member with a conveyor in a conveying direction to an unloading station,
unloading the article at the unloading station from the support member to a selected receiver in a plurality of receivers in a row arranged transversely with respect to the conveying direction, wherein each of the plurality of receivers in the row corresponds to one of the plurality of support locations extending adjacent each other in the row on the support member.

17. A sorting device, comprising:
a support member configured to support and transport an article, which is drivable in a conveying direction by an endless member, the support member having a plurality of support locations extending adjacent each other in a row, said row extending transversely with respect to the conveying direction;
a loading station configured to load an article on the support member;
an unloading station configured to remove an article from the support member, wherein the unloading station is provided with a plurality of receivers in a row, each receiver configured to receive an article being removed from the support member, the row of the plurality of receivers arranged transversely with respect to the conveying direction and disposed such that at least one receiver is below the support member when the support member is at the unloading station, wherein each of the plurality of receivers in the row corresponds to one of the support locations in the row of the plurality of support locations of the support member; and
a controller configured to direct transfer of an article from the support member to a selected one of the receivers.

18. The sorting device of claim 17, wherein the support member comprises a single tray which is tiltable about a tilting axis extending transversely with respect to the conveying direction.

19. The sorting device of claim 17, wherein the support member comprises a tray which is tiltable about a tilting axis extending transversely with respect to the conveying direction, and wherein the width of the tray is such that it overlaps the receivers in a direction extending transversely with respect to the conveying direction when the support member is at the unloading station.

20. The sorting device of claim 17, wherein the controller is configured such that the article is located at a predetermined support location of the plurality of support locations corresponding to the location of the selected receiver when the support member is at the unloading station.

* * * * *